United States Patent
Bytheway et al.

(10) Patent No.: US 9,619,675 B2
(45) Date of Patent: Apr. 11, 2017

(54) CAPACITIVE SENSOR INTEGRATED IN AN INTEGRATED CIRCUIT PACKAGE

(71) Applicant: CIRQUE CORPORATION, Salt Lake City, UT (US)

(72) Inventors: Jared G. Bytheway, Sandy, UT (US); Steven C. Peterson, South Jordan, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 14/247,618

(22) Filed: Apr. 8, 2014

(65) Prior Publication Data

US 2014/0304826 A1    Oct. 9, 2014

Related U.S. Application Data

(60) Provisional application No. 61/809,780, filed on Apr. 8, 2013.

(51) Int. Cl.
- *G06F 21/60* (2013.01)
- *G06F 21/86* (2013.01)
- *G06F 21/55* (2013.01)

(52) U.S. Cl.
CPC ............ *G06F 21/86* (2013.01); *G06F 21/558* (2013.01)

(58) Field of Classification Search
CPC .. G06F 21/60; G06F 21/6245; G06F 21/6254; G06F 21/10; G06F 21/6218
See application file for complete search history.

(56) References Cited

U.S. PATENT DOCUMENTS

| | | | | |
|---|---|---|---|---|
| 4,186,392 A * | 1/1980 | Holz | .................. | G06F 3/044 341/23 |
| 5,305,017 A * | 4/1994 | Gerpheide | ............ | G06F 3/0213 345/168 |
| 5,757,368 A * | 5/1998 | Gerpheide | .............. | G06F 3/038 345/157 |
| 8,608,066 B2 * | 12/2013 | Frojdh | .................... | G06F 3/033 235/375 |
| 2004/0178995 A1 * | 9/2004 | Sterling | .................. | G06F 3/044 345/173 |
| 2005/0035955 A1 * | 2/2005 | Carter | ............... | H04M 1/72522 345/175 |
| 2006/0087883 A1 * | 4/2006 | Ozguz | ..................... | G06F 21/87 365/185.04 |
| 2007/0070047 A1 * | 3/2007 | Jeon | ....................... | G06F 3/0412 345/173 |
| 2008/0278355 A1 * | 11/2008 | Moore | .................... | G06F 3/044 341/33 |
| 2009/0205049 A1 * | 8/2009 | Chakra | ............... | G06F 21/6218 726/26 |
| 2010/0026655 A1 * | 2/2010 | Harley | .................... | G06F 3/044 345/174 |
| 2012/0280923 A1 * | 11/2012 | Vincent | ................... | G06F 3/044 345/173 |
| 2014/0123299 A1 * | 5/2014 | Jung | ................. | G06F 17/30312 726/26 |

\* cited by examiner

*Primary Examiner* — Yonas Bayou
(74) *Attorney, Agent, or Firm* — Morriss O'Bryant Compagni, PC

(57) ABSTRACT

A system and method for disposing a capacitive proximity and touch sensor in locations where an integrated circuit package may be vulnerable to intrusion by providing electrodes in the packaging that may prevent interception of data obtained by a probe that is brought into proximity of the integrated circuit.

6 Claims, 5 Drawing Sheets

CAPACITIVE SENSOR INTEGRATED IN AN INTEGRATED CIRCUIT PACKAGE

BACKGROUND OF THE INVENTION

Field Of the Invention

This invention relates generally to touch sensors and integrated circuits. More specifically, the present invention disposes a capacitive proximity and touch sensor in an exposed area of an integrated circuit package with high resolution of position in the X and Y axes.

Description of Related Art

There are several designs for capacitance sensitive touch sensors. It is useful to examine the underlying technology to better understand how a capacitance sensitive touchpad may be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

It would be an advantage to use a touch sensor having circuitry similar to that as described to enable a proximity sensor to protect an integrated circuit package that may be vulnerable to intrusion.

BRIEF SUMMARY OF THE INVENTION

In a preferred embodiment, the present invention is a system and method for disposing a capacitive proximity and touch sensor in locations where an integrated circuit package may be vulnerable to intrusion by providing electrodes in the packaging that may prevent interception of data obtained by a probe that is brought into proximity of the integrated circuit.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensor" throughout this document includes any capacitive proximity and touch sensor device that can be disposed within touchpads, touch screens and touch panels, and includes proximity and touch sensing capabilities.

The present invention is the embedding of a capacitive proximity and touch sensor an area of an integrated circuit package that may be vulnerable to intrusion by a probe. The first embodiment of the present invention is the inclusion of electrodes in the packaging that surrounds an integrated circuit, wherein the electrodes and associated capacitive sensing circuitry for a touch controller may provide the ability to detect a probe. It should be understood that the touch controller may provide both proximity and touch sensing capabilities.

The prior art teaches that it may be possible to dispose individual electrodes around sensitive components in order to protect them. The electrodes may not need to be disposed in any particular pattern around the sensitive components, but rather disposed in whatever positions that are needed to intercept a probe.

In contrast, the present invention is directed to using a specific layout or arrangement of electrodes in order to provide the desired protection of sensitive components. Specifically, a first embodiment of the present invention is directed to a layout of orthogonal X and Y electrodes that may be used in a touchpad or touch screen. The X and Y electrodes may use mutual or self-capacitance techniques to detect a probe. The probe may be detected before it makes contact with a sensitive object being protected in a proximity detection mode of operation, or after contact is made in a touch mode of operation.

The first embodiment of the present invention may be directed to a system or method of creating a modified integrated circuit package. An integrated circuit package is defined as any package that may surround an integrated circuit that makes it possible for the integrated circuit to be used as part of an electrical circuit.

Figure 1:
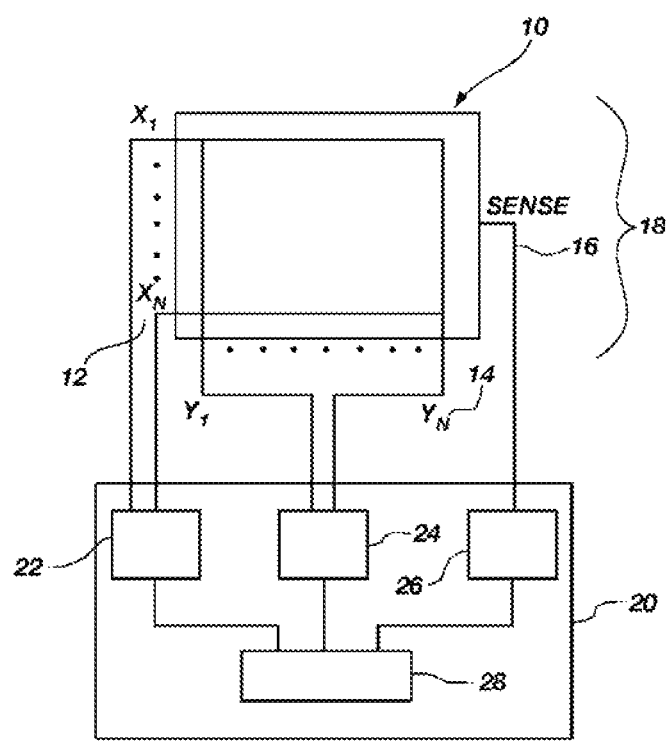
FIG. 1 is a block diagram of the components of a capacitance-sensitive touchpad as made by CIRQUE® Corporation and which may be operated in accordance with the principles of the present invention.
Figure 2:
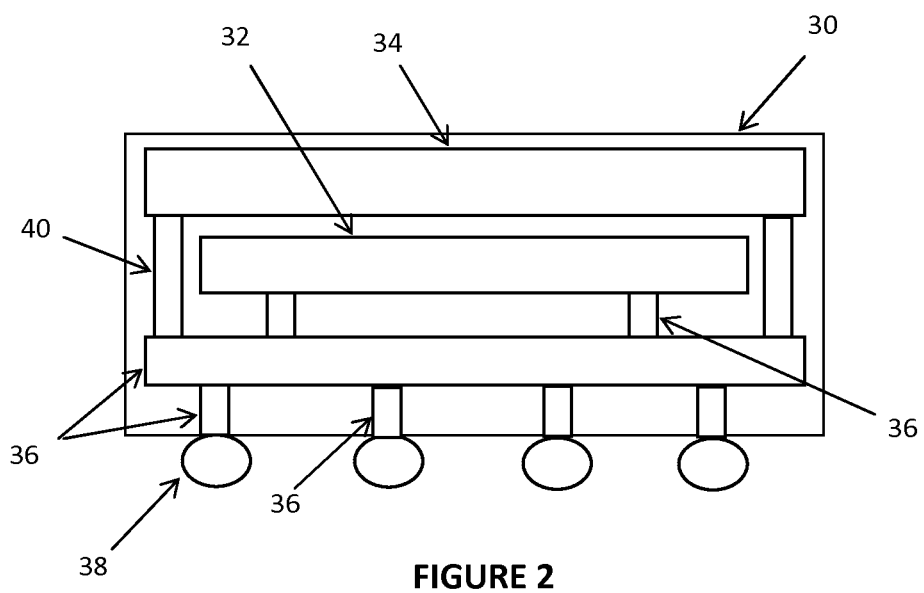
FIG. 2 is an elevational profile view of a first embodiment of the present invention.

FIG. 2 is provided as a block diagram of a first embodiment of the present invention. The block diagram shows how the layers of the first embodiment may be disposed within a protected integrated circuit package 30. The protected integrated circuit package 30 may include one or more integrated circuits 32 and communication pathways within the package that may all be referred to as protected components. At least one of these integrated circuits 32 should be a touch controller or should include a touch controller.

Figure 3:
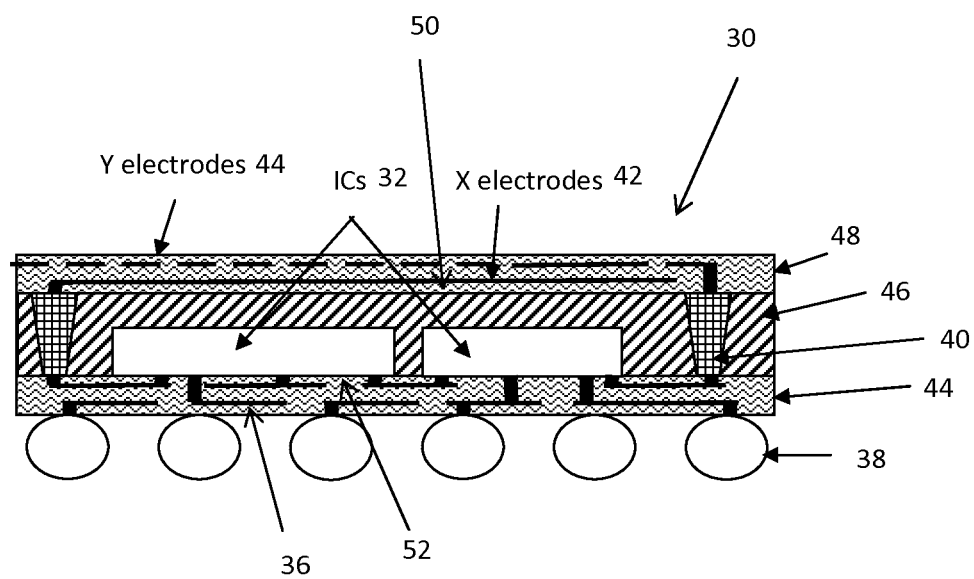
FIG. 3 is an elevational profile view of the first embodiment of the present invention showing more detail.

The protected integrated circuit package 30 may also include a sensor layer 34 comprised of a layer of X electrodes 42 and an orthogonal but co-planar layer of Y electrodes 44 (shown in FIG. 3). It does not matter which layer of electrodes are designated as X and which are Y electrodes 42, 44. The X and Y electrodes 42, 44 in the sensor layer 34 may switch between the functions of being drive electrodes and sense electrodes and operate in accordance with the well-known principles of proximity and touch sensing, and how to perform proximity and touch sensing are not considered a part of the novelty of the present invention. However, it is the placement of the sensor layer 34 within the protected integrated circuit package 30 that is considered a novel element of the first embodiment.

The protected integrated circuit package 30 may also include interconnecting electrodes 36 that enable signals from sensor layer 34 to reach a touch controller that is one or part of one of the integrated circuits 32. The interconnecting electrodes 36 may also enable signals between the integrated circuits 32 and a plurality of solder balls 38 or other connections to outside of the protected integrated circuit package 30.

The protected integrated circuit package 30 may also include vias 40 that may be needed to enable signals to travel between the sensor layer 34 and the integrated circuits 32. The vias 40 may be needed in order to travel between various layers of the protected integrated circuit package 30.

The components of the protected integrated circuit package 30 are not shown to scale or in a precise position within FIG. 2 and are shown only to show the general relationship between the various components.

Referring to a detailed layout as shown in FIG. 3, construction of the first embodiment may begin at the die or wafer level. A first embodiment of a protected wafer level packaging technique may begin with the following step. The first step may be to singulate or saw into sections a wafer comprised of a plurality of the same integrated circuit. The integrated circuit may be comprised of the drive and sense circuitry of a touch controller and any other circuits that make up a proximity and touch sensor and which may be disposed within the protected integrated circuit package 30 that may be protected by the first embodiment.

Thus, the protected integrated circuit package 30 may include one or more integrated circuits 32, wherein at least one of the integrated circuits is comprised of a touch controller. The protected integrated circuit package 30 may also be comprised of any other integrated circuits that may be protected inside the protected integrated circuit package.

Once the integrated circuit or circuits 32 to be disposed within a first embodiment of a protected integrated circuit package 30 are obtained, the integrated circuits must be prepared for inclusion in the protected integrated circuit package. In this step, the integrated circuits or wafer may be placed face down in an empty wafer reconstitution tray at desired spacing and in a desired arrangement.

The next step may be to fill the wafer reconstitution tray with a liquid encapsulant. The liquid encapsulant may be cured and then the cured encapsulant 46 with a reconstituted wafer 32 is then removed from the wafer reconstitution tray.

The next step may be to build up metal that will form electrodes in a redistribution layer 48 on a face 50 of the reconstituted wafer 32, and to create a desired pattern for the X and Y electrodes 42, 44 and etch as desired. The redistribution layer 48 may be disposed within an encapsulant. The redistribution layer 48 may be comprised of electrodes that may be used in a proximity and touch sensor, communication pathways for carrying signals to and from the integrated circuits 32, or both.

The redistribution layer 48 may be constructed as follows. It may be necessary to build up or apply a dielectric, such as a polyimide, to the face 50 of the reconstituted wafer 32 and over the pattern or grid of X and Y electrodes 42, 44. This would be the first array of electrodes, such as X electrodes 42. It is then necessary to create a second array of electrodes 44 that are orthogonal to the first array of electrodes 42. So after the dielectric is disposed over the first array of electrodes 42, it may be necessary to build up or apply metal on the dielectric layer in order to create a second array of electrodes 44 to form a mask and etch as desired. Typically this would be an array of strips of metal that are perpendicular to the first array, thereby forming an X-Y grid sensor that forms the sensor layer 44, with the first array of electrodes 42 substantially orthogonal to the second array of electrodes 44.

The last step of building the redistribution layer 48 may be to build up or apply a top layer of polyimide over the second or top array of electrodes 44 of the sensor layer 44.

The next step may be to drill vias 40 from the redistribution layer 48 on the face 50 of the reconstituted wafer 32 to the back 52 of the reconstituted wafer 32. The vias 40 may provide connections between the X and Y electrodes 42, 44 and a touch controller in the integrated circuits 32.

It is noted that alternatives to drilling to create the vias 40 may include etching or embedding zebra stripes in the encapsulant 46 or equivalent or some other method that obtains the same results for the vias.

The next step may be to build up or apply metal on the back 52 of the reconstituted wafer 32, then to create a pattern for a mask and then etch as desired. The pattern may be used to create an array of interconnections between the integrated circuits 32 and the solder balls 38 or other connections to the outside of the protected integrated circuit package 30.

Figure 4:
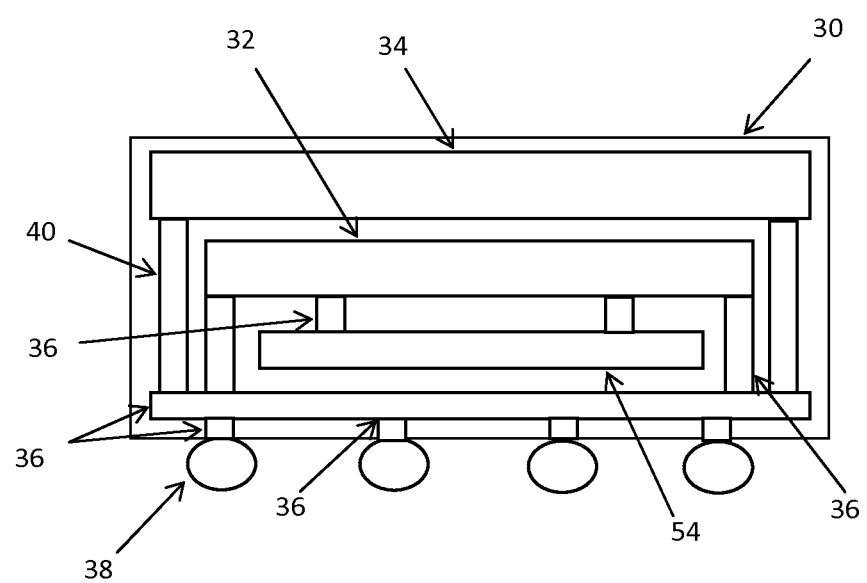
FIG. 4 is an elevational profile view of a second embodiment of the present invention.

In a second embodiment of the present invention shown in FIG. 4, there is a second sensor layer 54 that is added to the protected integrated circuit package 30. The second sensor layer is disposed on the back 52 in order to protect the bottom of the protected integrated circuit package 30. This second sensor layer 54 may be necessary if a probe is sent through a substrate on which the protected integrated circuit package 30 is mounted.

The size and position of the second sensor layer 54 should not be considered as limited by FIG. 4 as it is only representative of the second sensor layer being present underneath the integrated circuits 32.

Once the protected integrated circuit package 30 has been created, it may be necessary to create a baseline measurement for the touch controller within the protected integrated circuit package.

The baseline measurement may be recorded. The baseline measurement may be compared with subsequent periodic measurements using the sensor layers 34, 54, or periodic integrity measurements, in order to detect changes. Changes between the baseline measurement and subsequent periodic measurements may be an indication that a change has occurred in the protected integrated circuit package 30. This change is most likely to be the introduction of an object that changes the capacitance of the X and Y electrodes 42, 44 within the sensor layers 34, 54. An object that causes this change is most likely to be a probe that is introduced in an attempt to eavesdrop on data that is being transmitted by the integrated circuits 32.

If the subsequent periodic measurements are different than the baseline measurements, then the embodiments of the present invention may take action to prevent the loss or interception of data from the integrated circuits 32. The actions that may be taken include, but should not be considered as limited to, disabling operation of the integrated circuits 32, transmitting a signal to another integrated circuit or to another device so that some other device may take action, or erasing data stored in the integrated circuits.

It may be useful to examine embodiments of the present invention that demonstrate several potential applications of implementing a proximity and touch sensor to protect an integrated circuit package.

A first application may be to provide security to circuits implemented within an integrated circuit package. If a conductive object or objects that have a high dielectric come in proximity to the sensor layers 34, 54, they may be detected and a tamper flag may be set. Similarly, if the sensor layers 34, 54 are cut or altered, the subsequent periodic measurement may change when compared to the baseline measurement and a tamper flag may be set.

Another application may be to provide touch capabilities to control a portable or stationary electronic appliance. The protected integrated circuit package 30 may be placed in a small area such as under a key on a QWERTY keyboard in order to provide cursor control. The protected integrated circuit package 30 may also be disposed on or within a computer mouse for fine pointer control. The protected integrated circuit package 30 may also be disposed in a portable electronic appliance such as a smart phone, remote control, tablet, game controller or camera for touch or proximity applications.

Another application may be to make the protected integrated circuit package 30 part of a system that may sense patterned electrodes or conductors in an external material. For example, the conductors to be detected may be in a set pattern or in a random pattern. The conductors may be about the size of an X-Y crossover section or larger, and they may be grounded or floating. The pattern of the conductors would be used to convey or transmit a certain set of data from some outside object to a reader for the purpose of authorization, use of a password, characterization or personalization of settings etc.

Some examples of scanning conductors for data include batching numbers or settings on blood glucose strips to meters for diabetics; and validating smart cards that are in a contact slot by reading previously calibrated data stored on the smart card and comparing against measured data of uniquely patterned metal embedded in the smart card. Patterned metal in the smart card could be as simple as a sprinkle of metal shavings. This physical verification of the smart card helps reduce threats of skimming devices that could be inserted in a smart card reader. Another example is reading a unique metal pattern on an access card when the card is held up to sensor for controlled access to a building. Such patterns may be difficult to reproduce by a fraudster. Another example is verifying an authorized ink cartridge when inserted in a printer, and transferring a small amount of data such as a web address or phone number in advertising. This example is very similar to how QR codes are used today.

In an alternative embodiment, the present invention may be implemented at the die level. In this alternative embodiment, the upper two layers of available metallization are used to form an X and Y electrode grid by creating an initial or first array of electrodes in one dimension using one metal layer, and then complete the sensor by similarly creating a second array of electrodes that are substantially orthogonal or perpendicular to the first array. Connection to the X and Y electrodes that form the proximity sensor may then be accomplished by traditional via interconnect methods on the die.

Figure 5:
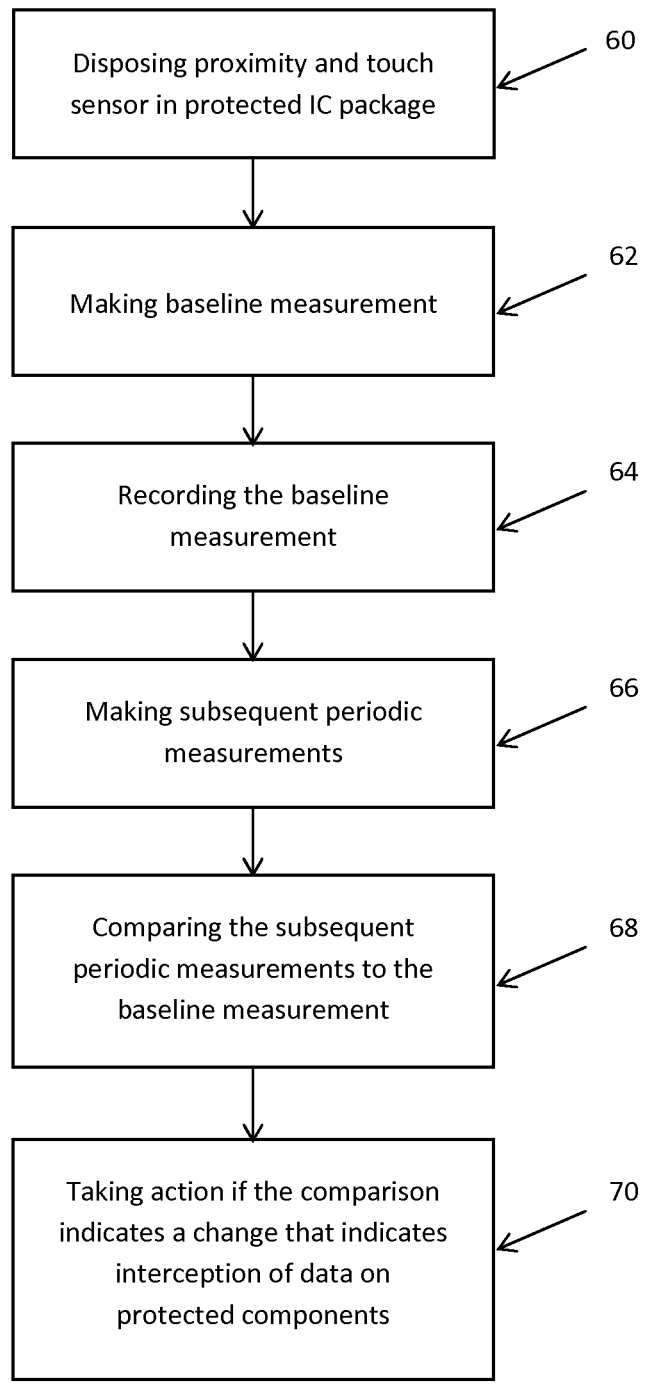
FIG. 5 is a flowchart of a first embodiment of the present invention.

FIG. 5 shows in a flowchart that the present invention may be used to protect data in integrated circuits disposed within the protected integrated circuit package 30, which may be referred to as protected components, from probing by following the steps of 1) disposing a proximity and touch sensor that is in electrical proximity to the protected integrated circuit package 30 to be monitored by manufacturing the proximity and touch sensor inside the protected integrated circuit package in item 60 2) making a baseline measurement of the environment around the protected integrated circuit package 30 in item 62 3) recording the baseline measurement to be used for making comparisons in item 64, 4) making subsequent periodic measurements in item 66, 5) comparing the subsequent periodic measurements to the baseline measurement in order to determine if there are changes between the subsequent periodic measurements and the baseline measurement in item 68, and 6) taking some action if there are changes in order to prevent the loss of data to a probe or other such means for interception of data in the protected integrated circuit package 30 in item 70.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for determining if data is being intercepted from a protected integrated circuit package, said method comprising:

providing at least one integrated circuit in an encapsulant, wherein the at least one integrated circuit is a touch controller, wherein a first sensor layer comprised of X and Y co-planar electrodes is disposed within the encapsulant on a non-connecting side of a protected integrated circuit package wherein a second sensor layer comprised of X and Y co-planar electrodes is disposed within the encapsulant on a connecting side of the protected integrated circuit package, wherein the X and Y electrodes of the first and second sensor layers are coupled to the touch controller to thereby provide signals to the touch controller regarding an environment around the protected integrated circuit package;

making a baseline measurement of an environment around the protected integrated circuit package using the sensor layer and the touch controller within the encapsulant of the protected integrated circuit package;

recording the baseline measurement;

making subsequent periodic measurements;

comparing the baseline measurement and the subsequent periodic measurements to determine if there are changes in capacitance around the protected integrated circuit package; and performing an action if there are changes in capacitance that indicate that data is being intercepted from the protected integrated circuit package.

2. The method as defined in claim 1 wherein the method further comprises selecting at least one protected component within the encapsulant from the group of protected components comprised of integrated circuits and communication pathways.

3. The method as defined in claim 1 wherein the method further comprises detecting changes that are selected from the group of changes comprised of movement of the protected integrated circuit package, and creation of a new connection to the protected integrated circuit package.

4. The method as defined in claim 1 wherein the method further comprises selecting the action to be taken if there are changes in capacitance that indicate that data is being intercepted from the protected integrated circuit package is selected from the group of actions comprised of disabling operation of the at least one protected component, transmitting a signal to another integrated circuit or to another device so that some other device may take action, or erasing data stored in the protected integrated circuit package.

5. The method as defined in claim 1 wherein the method further comprises making the subsequent periodic measurements at periodic intervals to thereby periodically check for changes in capacitance on the protected integrated circuit package.

6. The method as defined in claim 1 wherein the method further comprises providing a second integrated circuit within the encapsulant around the at least one first integrated circuit.

* * * * *